US005124880A

United States Patent [19]

Okamoto et al.

[11] Patent Number: 5,124,880

[45] Date of Patent: Jun. 23, 1992

[54] CONNECTOR PROVIDED WITH CAPACITORS

[75] Inventors: Hiroyuki Okamoto; Kunio Hoshino, both of Shizuoka, Japan

[73] Assignee: Yazaki Corporation, Japan

[21] Appl. No.: 570,916

[22] Filed: Aug. 22, 1990

[30] Foreign Application Priority Data

Aug. 25, 1989 [JP] Japan ................................ 1-217409

[51] Int. Cl.$^5$ ................................ H01G 1/14

[52] U.S. Cl. ................................ 361/306

[58] Field of Search ............... 361/302, 306, 307, 540, 361/400, 406, 405, 408, 404, 538

[56] References Cited

U.S. PATENT DOCUMENTS

| | | | |
|---|---|---|---|
| 3,345,622 | 10/1967 | Matsushita | 340/174 |
| 3,519,890 | 7/1970 | Ashby | 361/306 X |
| 3,585,455 | 6/1971 | Naylor | 361/306 X |
| 4,467,401 | 8/1984 | Siebert et al. | 361/306 |
| 4,738,631 | 4/1988 | Takahashi et al. | 439/248 |
| 4,764,848 | 8/1988 | Simpson | 361/408 |
| 4,810,215 | 3/1989 | Kaneko | 439/845 |

FOREIGN PATENT DOCUMENTS 79477 10/1984 Japan .

*Primary Examiner*—Donald A. Griffin

*Attorney, Agent, or Firm*—Wigman & Cohen

[57] ABSTRACT

The connector provided with at least one capacitor comprises: a resin connector housing; a metallic shield casing; and at least one connector terminal formed with, in particular a flexible portion to absorb thermal deformation of the resin connector housing relative to the metallic shield casing due to a difference in thermal expansion coefficient between the two, caused when the connector terminal is soldered to the capacitor or a printed circuit board.

8 Claims, 5 Drawing Sheets

CONNECTOR PROVIDED WITH CAPACITORS

BACKGROUND OF THE INVENTION

1. Field of the Invention

The present invention relates to a connector provided with capacitors and more specifically to a connector provided with capacitors, which is not subjected to harmful influence of thermal deformation caused during soldering process. Further, capacitors provided for the connector serve to eliminate (short) relatively high frequency component signals from relatively low frequency component signals passed through the connector terminals.

2. Description of the Prior Art

An example of prior-art connectors provided with capacitors is shown in FIGS. 1(A) to (D). In FIG. 1(A), the prior-art connector comprises a resin connector housing 2, a metallic shield casing 4 fitted to the connector housing 2, a plurality of connector terminals 18 passed through the shield casing 4, and a plurality of cylindrical capacitors 11 soldered between the shield casing 4 and the connector terminal 18, respectively. The connector housing 2 is formed with an internal partition 2A having plural terminal holding projections 2B.

In assembly, the straight connector terminals 18 are pressure-fitted into the central holes 2B-1 of the terminal holding projections 2B, respectively. On the other hand, capacitors 11 are fitted into capacitor holes 4*a* formed in the shield casing 4 with solid solder 12A interposed between the capacitors 11 and the shield casing 4, respectively as shown in FIG. 1(C), before being passed through a heating furnace (not shown) to solder each outer electrode of each cylindrical capacitor 11 to the shield casing 4 via the melted and solidified solder 12A.

Thereafter, the connector terminals 18 are passed through central holes 11*a* of the capacitors 11 with solid solder 12B interposed between the connector terminals 18 and the capacitors 11 respectively, until the shield casing 4 is fitted to the connector housing 2, as shown in FIG. 1(B), before being passed through the heating furnace (not shown) to solder each inner electrode of each cylindrical capacitor 11 to each the connector terminal 18 via the melted and solidified solder 12B. Thereafter, the outside portions of the connector terminals are bent into L-shape as shown in FIG. 1(A) without applying internal stress to the solder portions 12A and 12B, to accomplish the assembly of the connector provided with capacitors.

Further, as shown in FIG. 1(B), a ground terminal 13 is fixed to the shield casing 4 perpendicular to the surface of the casing 4. The connector is fixed to a printed circuit board 15 by soldering the ground terminal 13 and ends of terminal pin portions 18*a* of the terminals 18 to the circuit board 15 via solder 12D and solder 12C, respectively. Further, in FIG. 1(B), terminal tab portions 18*c* are mated with female terminals (not shown) of a female connector.

In the prior-art connector provided with capacitors as described above, however, since the connector terminals 18 passed through the connector housing 2 are soldered to the shield casing 4 within a soldering furnace and additionally the terminal pin portions 18*a* of the connector terminals 18 and the ground terminal 13 are soldered to a printed circuit board 15 within a soldering bath arranged on an automatic soldering process line, there exists a problem in that the resin connector housing 2 tends to be deformed relative to the metallic shield casing 4 in three (x, y, z) dimensional directions, in particular in the x direction, as shown by dot-dashed lines in FIG. 1(D), due to a difference in thermal expansion coefficient between the resin connector housing 2 (i.e. the terminal holding portions 2B) and the metallic shield casing 4. Therefore, when the terminal holding portions 2B is deformed, since the rigidity of the connector terminals 18 is higher than that of the capacitor material or the soldering material, cracks CR are easily produced at the solder portions 12A and 12B or the cylindrical capacitor 11 at the worst.

In this connection, it is possible to reduce the thermal stress at the cylindrical capacitor 11 caused by a thermal expansion of the connector terminal 18 by forming a small-diameter portion between the cylindrical capacitor 11 and a bent corner of the connector terminal 18 as disclosed in Japanese Published Unexamined (Kokai) Utility Model Appli. No. 61-79477. However, this method will not reduce the thermal deformation of the connector housing 2 relative to the shield casing 4 due to a difference in thermal expansion coefficient between the resin connector housing 2 and the metallic shield casing 4.

SUMMARY OF THE INVENTION

With these problems in mind, therefore, it is the primary object of the present invention to provide a connector provided with capacitors which can absorb thermal deformation caused when capacitors are soldered to the connector or when the connector is soldered to a printed circuit board so that cracks will not be produced at the solder portions or the cylindrical capacitors.

To achieve the above-mentioned object, a connector provided with a capacitor, according to the present invention comprises: (a) a connector housing (2); (b) a shield casing (4) engaged with said connector housing; (c) at east one capacitor (11) having an outer electrode soldered to said shield casing and an inner electrode; (d) at least one connector terminal (9) passed through said connector housing and said capacitor, including: (1) a male tab portion (9*c*); (2) a middle portion (9*b*) pressure-fitted to said connector housing for terminal support; (3) a terminal pin portion (9*a*) soldered to the inner electrode of said capacitor at an inner end thereof and to a printed circuit board at an outer end thereof; and (4) a flexible portion (8) formed between said middle portion and the inner end of said terminal pin portion. When the connector terminal is a strip shaped terminal formed with a S-shaped bent flexible portion when seen in a plan view and into a recessed shape when seen in a side view, a width W of said S-shaped bent flexible portion is narrower than that W of said male tab portion and a thickness $t_1$ of said S-shaped bent flexible portion is thinner than that t of said male tab portion and said terminal pin portion. Further, it is preferable to further form a narrow width portion (9*e*) in the terminal pin portion (9*a*) for stress absorption.

In the connector provided with capacitors, since the connector terminal is formed with a flexible portion (18) between the middle portion and the inner end of the terminal pin portion, it is possible to effectively absorb thermal deformation stress generated at the capacitors and the solder portions due to a difference in thermal expansion coefficient between said resin connector housing and said metallic shield casing, whenever the connector terminals are soldered to the capacitors or a printed circuit board, thus preventing of cracks from being produced at the solder portions and the capacitors.

BRIEF DESCRIPTION OF THE DRAWINGS

The features and advantages of the connector provided with capacitors according to the present invention will be more clearly appreciated from the following description taken in conjunction with the accompanying drawings in which like reference numerals designate corresponding elements and in which.

DETAILED DESCRIPTION OF THE PREFERRED EMBODIMENTS

Figure 1A:
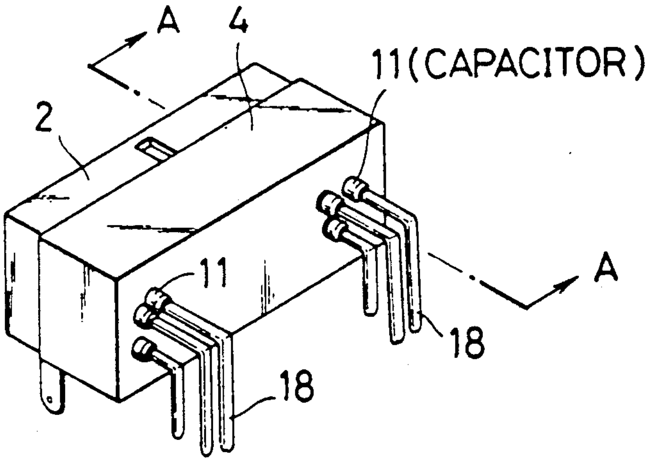
FIG. 1(A) PRIOR ART
FIG. 1(A) is a perspective view showing a prior-art connector provided with capacitors.
Figure 1B:
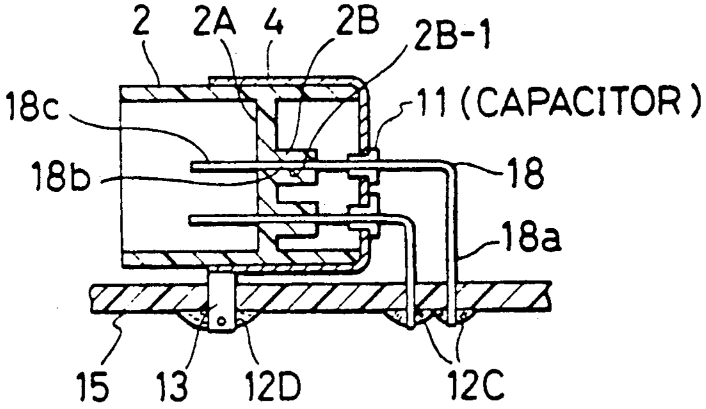
FIG. 1(B) PRIOR ART
FIG. 1(B) is a cross-sectional view taken along the line A—A shown in FIG. 1(A)
Figure 1C:
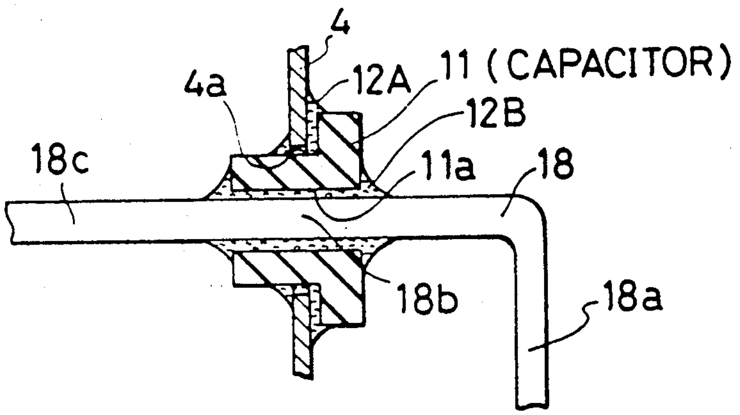
FIG. 1(C) PRIOR ART
FIG. 1(C) is an enlarged cross-sectional view showing a capacitor soldered between the shield casing and the connector terminal.
Figure 1D:
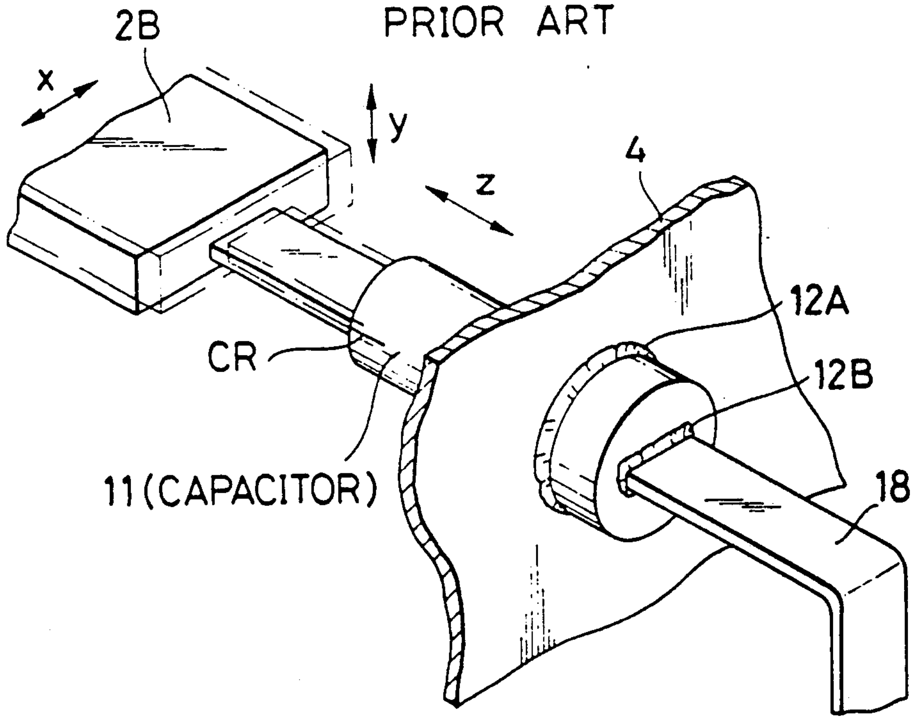
FIG. 1(D) PRIOR ART
FIG. 1(D) is an enlarged perspective view for assistance in explaining the thermal deformation of the resin connector housing relative to the metallic shield casing in the prior-art connector.
Figure 2:
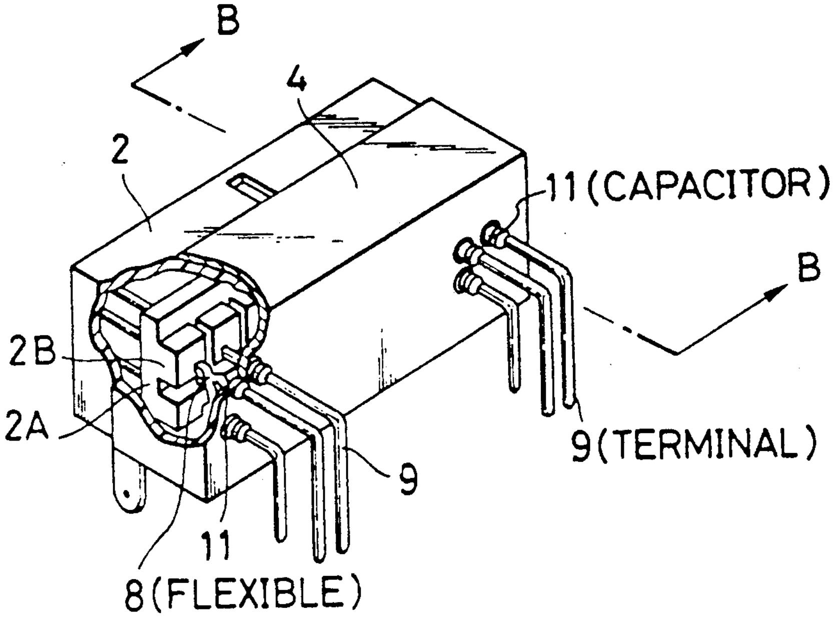
FIG. 2 is a perspective, partly broken view showing a first embodiment of the connector provided with capacitors according to the present invention.
Figure 4:
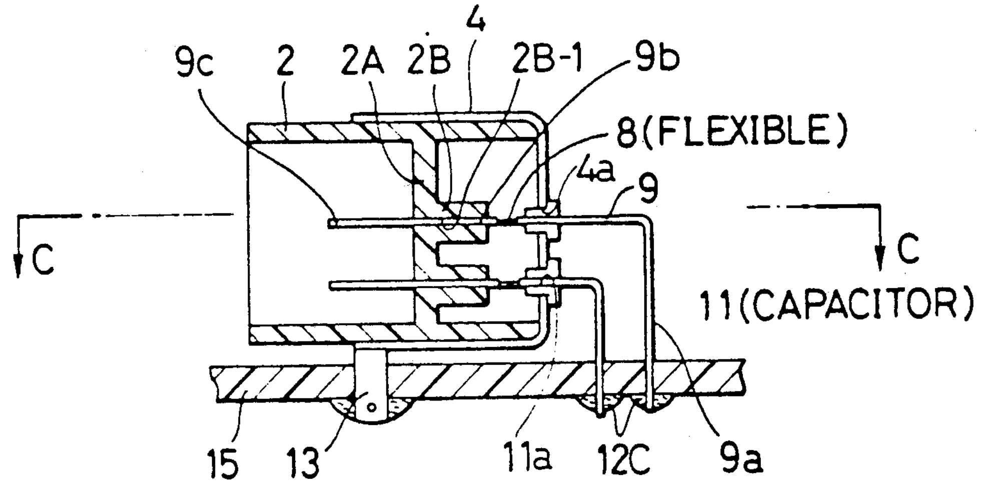
FIG. 4(A) is a cross-sectional view taken along the line B—B shown in FIG. 2.
FIG. 4(B) is a cross-sectional view taken along the line C—C shown in FIG. 4(A)
Figure 4:
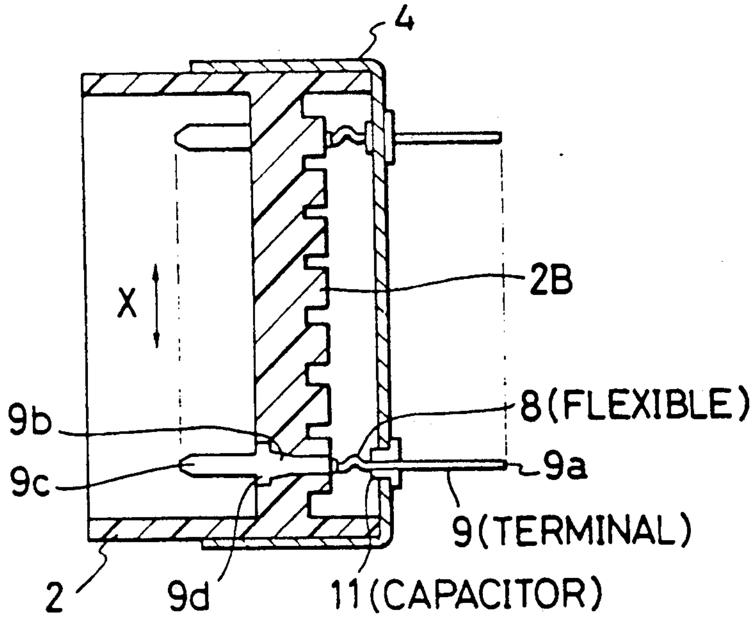

An embodiment of the connector provided with capacitors according to the present invention will be described in more detail hereinbelow with reference to the attached drawings. In FIGS. 2 and 4(A), the connector provided with capacitors according to the present invention roughly comprises a resin connector housing 2, a metallic shield casing 4 engaged with the outside surface of the connector housing 2, a plurality of strip-shaped connector terminals 9 passed through the shield casing 4, and a plurality of cylindrical capacitors 11 soldered between the shield casing 4 and the connector terminal 9, respectively. The connector housing 2 is formed with an internal partition 2A having plural terminal holding projections 2B.

Straight strip-shaped connector terminal 9 are pressure-fitted into square holes 2B-1 of the terminal holding projections 2B of the connector housing 2, respectively from the left side in FIG. 4(A). On the other hand, cylindrical capacitors 11 are fitted into capacitor holes 4*a* formed in the shield casing 4, respectively with solid solder 12A interposed therebetween, from the right side in FIG. 4(A), and the shield casing 4 is passed through a soldering furnace to solder each outer electrode of each cylindrical capacitor 11 to the shield casing 4 via the solder 12A (shown in FIG. 6). Thereafter, the connector terminals 9 are passed through the square holes 11*a* of the capacitors 11, respectively with solid solder 12B interposed therebetween until the shield casing 4 is securely engaged with the outside surface of the connector housing 2, and the connector is passed through another soldering furnace to solder each inner electrode of each cylindrical capacitor 11 to each connector terminal 9 via solder 12B (shown in FIG. 6). Thereafter, the terminal pin portions 9*a* of the connector terminals 9 are bent into an L-shape, respectively. Further, a ground terminal 13 is fixed to the shield casing 4 perpendicular to the surface of the casing 4.

The feature of the connector according to the present invention is to include strip-shaped connector terminals 9 each formed with a flexible portion 8. In more detail, each connector terminal 9 includes a terminal pin portion 9*a*, a middle portion 9*b*, a male tab portion 9*c*, two stopper portions 9*d* and a flexible portion 8. The terminal pin portion 9*a* is soldered to the inner electrode of the capacitor 11 at the inner end thereof and a printed circuit board at the outer end thereof; the middle portion 9*b* is pressure fitted to the terminal holding projection 2B of the connector housing 2; the male tab portion 9*c* is mated with a female connector terminal (now shown) of a female connector; the two stopper portions 9*d* are engaged with two cut-out portions 2B-2 (shown in FIG. 5) of the terminal holding projection 2B of the connector housing 2 to locate the connector terminal to the connector housing; and the flexible portion 8 is formed between the middle portion 9*b* and the inner end of the terminal pin portion 9*a* or between the terminal holding projection 2B and the cylindrical capacitor 11.

Figure 3:
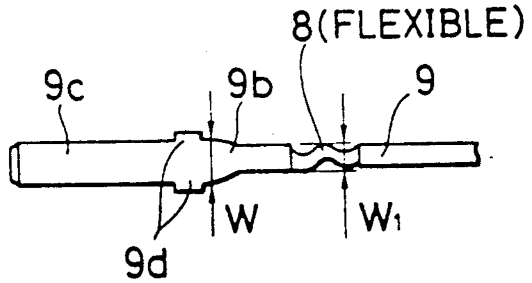
FIG. 3(A) is an enlarged plan view showing a strip-shaped connector terminal.
FIG. 3(B) is an enlarged side view showing the strip-shaped connector terminal shown in FIG. 3(A)
Figure 3:
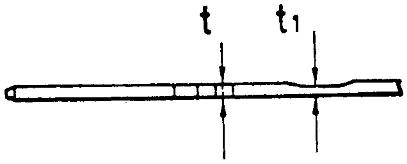

The flexible portion 8 is formed into a S-shape when seen in a plan view as shown in FIG. 3(A) and into a recessed shape when seen in a side view as shown in FIG. 3(B). The width W of the S-shaped flexible portion 8 is determined smaller than that W of the middle portion 9*b* of the connector terminal 9, and the thickness $t_1$ of the S-shaped flexible portion 8 is determined smaller than that t of the other portions of the connector terminal 9.

Figure 5:
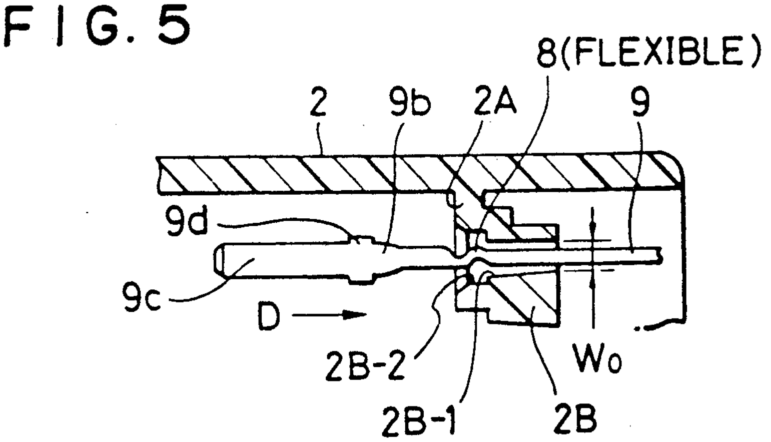
FIG. 5 is a partial cross-sectional view for assistance in explaining a process during which a strip-shaped connector terminal is inserted into a terminal hole of the terminal holding portion of the connector housing.

FIG. 5 shows an intermediate process when the connector terminal 9 is pressure-fitted into the square hole 2B-1 and the two cut-out portions 2B-2 of the terminal holding projection 2B of the connector housing 2, in the direction D from the left side in FIG. 5. In this process, since the width $W_1$ (shown in FIG. 3(A)) of the flexible portion 8 is determined smaller than that $W_0$ (shown in FIG. 5) of the square hole 2B-1 of the terminal holding projection 2B, the connector terminal 9 formed with the flexible portion 8 can be smoothly pressure-fitted into the terminal holding projection 2B until the stopper portions 9*d* are brought into tight contact with the two cut-out portions 2B-2 of the terminal holding projection 2B.

Figure 6:
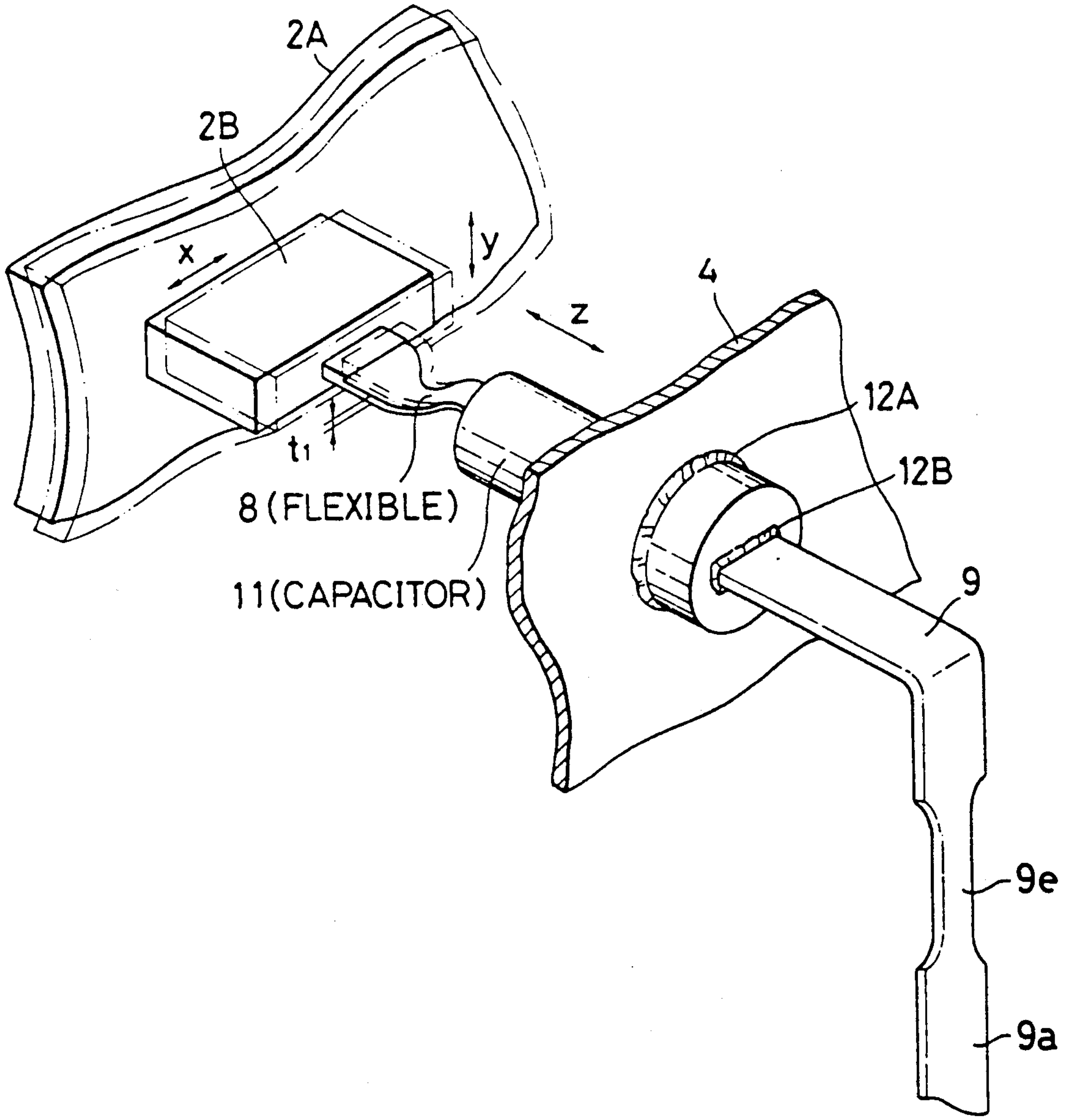
FIG. 6 is an enlarged perspective view for assistance in explaining the thermal deformation of the resin connector housing relative to the metallic shield casing in the connector according to the present invention.

FIG. 6 shows an example of deformation of the internal partition 2A, the terminal holding projection 2B and the flexible portion 8 of the connector terminal 9 by dot-dot-dashed lines, which is caused when the middle portion 9*b* of the connector terminal 9 is soldered to the internal electrode of the cylindricals capacitor 11 or when the terminal pin portion 9*a* of the connector terminal 9 is soldered to a printed circuit board 15 shown in FIG. 4(A). In FIG. 6, although the deformation of the resin connector housing 2 is produced in the x direction (the width direction of the connector terminal 9) due to a difference in thermal expansion coefficient between the metallic shield casing 4 and the resin connector housing 2 (i.e. the terminal holding projection 2B), this x-direction deformation can be effectively absorbed by a width-direction bending of the S-shaped flexible portion 8 of the connector terminal 9, so that it is possible to prevent a thermal stress from being generated at the solder portions 12A and 12B or cracks from being produced at the cylindrical capacitor 11. Further, the y-direction deformation of the resin connector housing 2 (i.e. the terminal holding projection 2B) can be absorbed by a thickness-direction bending of the thin-thickness ($t_1$) flexible portion 8, and the z-direction deformation of the resin connector housing 2 can be absorbed by a length-direction compression or an expansion of the S-shaped flexible portion 8.

In addition, where a narrow width portion 9*e* as shown in FIG. 6 is formed at the terminal pin portion 9*a* or between the capacitor connecting solder portion 12B (shown in FIG. 6) and the printed circuit connecting solder portion 12C (shown in FIG. 4(A)), it is possible to preferably absorb thermal stress generated at the connector terminal 9 when the terminal 9 is soldered to a printed circuit board.

As described above, in the connector provided with capacitors according to the present invention, since each connector terminal is formed with a S-shaped flexible portion having a width and a thickness smaller than those of the other portions of the connector terminal, it is possible to effectively absorb thermal stress or thermal deformation of the resin connector housing relative to the shield casing due to difference in thermal expansion coefficient between the resin connector housing and the metallic shield casing when the connector terminals are soldered to the cylindrical capacitors and/or to a printed circuit board, thus preventing the occurrence of cracks at the solder portions and the cylindrical capacitors. Further, since the width of the S-shaped flexible portion is determined smaller than that of the male tab portion of the connector terminal, it is possible to use the conventional elements and adopt the conventional assembly method by modifying only the connector terminals.

What is claimed is:

1. A connector provided with a capacitor, comprising:
(a) a connector housing;
(b) a shield casing engaged with said connector housing;
(c) at least one capacitor having an outer electrode soldered to said shield casing and an inner electrode;
(d) at least one connector terminal passed through said connector housing and said capacitor, including:
(1) a male tab portion;
(2) a middle portion pressure-fitted to said connector housing for terminal support;
(3) a terminal pin portion soldered to the inner electrode of said capacitor at an inner end thereof and to a printed circuit board at an outer end thereof; and
(4) a flexible portion formed between said middle portion and the inner end of said terminal pin portion;
wherein said connector terminal is a strip-shaped terminal formed with a S-shaped bent flexible portion when seen in a plan view.

2. The connector provided with a capacitor of claim 1, wherein a width W of said S-shaped bent flexible portion is narrower than that W of said male tab portion and a thickness $t_1$ of said S-shaped bent flexible portion is thinner than that t of said male tab portion and said terminal pin portion.

3. The connector provided with a capacitor of claim 1, wherein said terminal pin portion is further formed with a narrower width portion for stress absorption.

4. The connector provided with a capacitor of claim 1, wherein said middle portion is further formed with a pair of stopper portions for locating said connector terminal to said connector housing.

5. A connector provided with a capacitor, comprising:
(a) a connector housing;
(b) a shield casing engaged with said connector housing;
(c) at least one capacitor having an outer electrode soldered to said shield casing and an inner electrode;
(d) at least one connector terminal passed through said connector housing and said capacitor, including:
(1) a male tab portion;
(2) a middle portion pressure-fitted to said connector housing for terminal support;
(3) a terminal pin portion soldered to the inner electrode of said capacitor at an inner end thereof and to a printed circuit board at an outer end thereof; and
(4) a flexible portion formed between said middle portion and the inner end of said terminal pin portion;
wherein said connector terminal is a strip-shaped terminal formed with a S-shaped bent flexible portion when seen in a plane view and into a recessed shape when seen in a side view.

6. The connector provided with a capacitor of claim 5, wherein a width W of said S-shaped bent flexible portion is narrower than that W of said male tab portion and a thickness $t_1$ of said S-shaped bent flexible portion is thinner than that t of said male tab portion and said terminal pin portion.

7. The connector provided with a capacitor of claim 5, wherein said terminal pin portion is further formed with a narrower width portion for stress absorption.

8. The connector provided with a capacitor of claim 5, wherein said middle portion is further formed with a pair of stopper portions for locating said connector terminal to said connector housing.

* * * * *